United States Patent Office 3,155,467
Patented Nov. 3, 1964

3,155,467
PALLADIUM ALLOY PERMEABLE WALL FOR THE SEPARATION AND PURIFICATION OF HYDROGEN
Yuzo Yamamoto, Musashino-shi, Tokyo, and Ryosuke Goto, Setagaya-ku, Tokyo, Japan, assignors, by mesne assignments, to Nippon Junsuiso Kabushiki Kaisha, a corporation of Japan
No Drawing. Filed Aug. 4, 1961, Ser. No. 129,237
10 Claims. (Cl. 55—16)

This invention relates to a process of separating superpure hydrogen from gaseous mixtures containing hydrogen and of purifying commercial cylinder hydrogen containing oxygen, nitrogen, water vapour (moisture), hydrocarbons, alkali mists, etc. by passing them through a palladium alloy hydrogen permeable wall, and, also, relates to a palladium alloy hydrogen permeable wall used for said purposes.

In general, in hydrogen atmosphere at low temperature, Pd and Pd alloys absorb a large amount of hydrogen and, as a result, the amount of $\beta$ phase Pd, i.e., a compound of Pd and hydrogen, increases. The value obtained by dividing the number of atoms of hydrogen absorbed by the number of atoms of the absorbent Pd alloy is called the atomic ratio. When in equilibrium with ambient hydrogen at low temperature, pure Pd is converted entirely into $\beta$ phase Pd, and the atomic ratio is 0.65–0.75. As the said $\beta$ phase Pd is hard and fragile, it, when used as a permeable wall, causes innumerable wrinkles, which develop into slender cracks, and finally gets broken down. Accordingly, the smaller the value of H/Me, the longer the life of the permeable wall.

Next, the hydrogen permeation rate is the volume of pure hydrogen per min. permeating in direct proportion to the pressure differential, i.e., $P_1-P_2=\Delta P$, at the time the raw material hydrogen is fed under pressure $P_1$ (kg./cm.$^2$) to one side of the permeable wall and, leaving the impurities at the side of the raw material hydrogen, the pure hydrogen alone is withdrawn under pressure $P_2$ (kg./cm.$^2$) out of the opposite side of the permeable wall; it is represented by Q and the unit thereof is cm.$^3$/cm.$^2$ min.

In the separation and purification of hydrogen by means of a Pd alloy permeable wall, always $P_1>P_2$, and the greater $\Delta P$ is, the more efficiently hydrogen permeates, but not in the case of $P_1=P_2$. To make $\Delta P$ great, the wall thickness $t$ is made great, but, in effect, if $t$ becomes great, Q decreases. Accordingly, there arises the necessity of increasing the tensile strength at a high temperature (for example, 500°–600° C.) of a Pd alloy for the permeable wall.

Prior to this invention, there was a process in which hydrogen was purified by using a permeable wall of pure Pd at a temperature of 300°–400° C., but pure Pd is converted entirely into $\beta$ phase Pd, i.e., a compound of Pd and hydrogen, at below 200° C., and becomes fragile and breaks down after being in use for a short time, so that it is of no practical use.

Next, a method of passing hydrogen through a heated alloy wall in which less than 50% of Ag has been alloyed to Pd has been proposed as U.S. Patent No. 2,773,561 (1956), but with this binary alloy, though the tendency of the wall to become fragile at low temperature has been decreased to some extent, the high temperature tensile strength and the resistance to corrosive oxidation at high temperatures are far inferior as compared with the alloy wall of this invention, and the crystal structure is coarse, tending to become fragile owing to the grain growth, and, further, the hydrogen permeation rate Q, too, falls much faster as compared with the alloy wall of this invention.

The primary object of this invention is to manufacture highly pure hydrogen economically and with high efficiency.

The second object of this invention is to obtain a Pd alloy permeable wall with the hydrogen permeation rate Q which is superior by about 96–140% as compared with the pure Pd wall and by about 34% as compared with the Pd-Ag alloy wall, under the same conditions (temperature T, pressure differential $\Delta P$, and wall thickness $t$).

The third object of this invention is to obtain a permeable wall alloy having a greater Q value by elevating the tensile strength (kg./cm.$^2$) at high temperatures 2–3 times as compared with the pure Pd and Pd-Ag alloy walls, further strengthening the resistance to corrosive oxidation at high temperatures, and using pressure differential $\Delta P$ higher than possible with the former at high temperatures.

The fourth object of this invention is to obtain an alloy wall of fine crystal structure and, at the same time, to prevent the grain growth by which the alloy becomes fragile, even at high temperatures.

The fifth object of this invention is to obtain a permeable wall alloy which will not become a single $\beta$ phase composition at room temperature, i.e., will not give rise to a fragilization phenomenon at a low temperature.

This invention, in order to accomplish the foregoing objects thereof, possesses the following characteristic features.

That is to say, this invention is characterized by a process for the separation and purification of hydrogen which is carried out by using a permeable wall of a Pd alloy of three or more components containing 2–40% of at least one element in the I$b$ group and 0.1–20% of at least one element in the VIII group of the Periodic Table, and, also, characterized by a hydrogen permeable wall of a Pd alloy of specific composition used for said purposes.

As the Pd alloy of three or more components of this invention permeates no gas but hydrogen, a highly pure hydrogen not containing any impurities can be obtained easily and simply. Even when 2–40% of at least one element selected from among Cu, Ag and Au in the I$b$ group and 0.1–20% of at least one element selected from among Fe, Co, Ni, Rh, Ru, Pt, Ir and Os in the VIII group are added to Pd, the selectivity of the hydrogen permeable Pd alloy wall is not at all impaired, and, accordingly, there is the advantage that even if this Pd alloy wall is used continuously for a long time for the purposes of separating and purifying hydrogen, there appears no change whatsoever, regardless of the wall thickness, in the purity of the hydrogen obtained.

In case an element from the I$b$ group alone is added to Pd, the resistance to corrosive oxidation at high temperatures deteriorates (except for the addition of Au), and, therefore, there is strong reason to fear that when the permeable wall is used for many hours, any gases other than hydrogen might pass through it together with hydrogen. Accordingly, this invention has completely prevented this phenomenon from occurring by the addition of an element from the VIII group.

In this invention, for the purpose of increasing the Q value of a hydrogen permeable wall Pd alloy by up to about 140% more than the Q value of a pure Pd wall and by about 34% more than that of a Pd-Ag alloy wall, at least one element selected from the I$b$ group and one from the VIII group have been added within the range as shown in the claim to pure Pd to make it into an alloy of three or more components. That is to say, for increasing the Q value as compared with a pure Pd wall, the addition of an element from the I$b$ group is effective, but said Q value can be increased further by the cooperation of an element from the VIII group. In this case, the element from the Ib group commences demonstrating its effect by the addition of 2% at minimum, the maximum effect being at around 30–35%, and at over 40%, the Q value decreases sharply. Further, the effective amount of an element from the VIII group to be added as a cooperating element is from 2% so far as the question of Q value is concerned, and in the range of 5–10%, the Q value, though it increases, is such as makes no great difference, and at over around 20%, it no longer increases, but, to the contrary, begins decreasing. Accordingly, from the economical point of view, it follows that 5–10% of an element from the VIII group is the appropriate amount to be added.

As stated herein above, in this invention, as the Q value has increased as compared with the conventional Pd alloy wall, there is a great economic advantage in that a small sized apparatus will separate and purify the same amount of hydrogen as is possible with larger equipment of the prior known art, thereby attaining the object economically.

Further, according to this invention, it is possible to increase the high temperature tensile strength (kg./cm.$^2$) of a hydrogen permeable wall 2–3 times as compared with the pure Pd and Pd-Ag alloy walls. That is to say, with the addition of an element from the Ib group alone to pure Pd, the high temperature tensile strength is inadequate in the temperature range of 300°–600° C., but the addition of an element from the VIII group, coupled with the co-operation of an element from the Ib group, gives rise to multiple effects, thereby making it possible to increase the high temperature tensile strength strikingly. However, if elements from both the VIII group and the Ib group are added in an amount more than needed, the Q value all the more decreases. It is because of this restriction that the amount of at least one element in the VIII group to be added is limited to 0.1–20%; the range of the amount to be added which is most effective for increasing the tensile strength without decreasing the Q value is 5–10%.

Further, in this invention, there is an advantage that if at least one element selected from among Au, Au+Ag and Au+Cu in the Ib group and one from among Pt, Rh, Ru and Ir in the VIII group are added to Pd, the resistance to corrosive oxidation at high temperatures of the Pd alloy strikingly increases. Accordingly, there is the advantage that it can be used for a long period without any trouble and without being subjected to corrosion due to high temperature aqueous vapor even when separating and purifying hydrogen from humid gaseous mixtures.

As the permeable wall alloy of this invention contains 0.1–20% of at least one element from the VIII group added other than the element from the Ib group, the crystal structure thereof is fine, and this crystal structure is prevented from becoming coarse even through use at high temperature, so that there is the additional advantage that no trouble is caused through continuous use for a long period. Especially, in the case of addition of Fe, Co and Ni, the crystals become fine with about 0.1–1% added, and the growth thereof can also be prevented. Accordingly, this invention brings forth the effect that even when the permeable wall is used continuously at a high temperature of 500°–600° C., no trouble is caused, making the Q value great. The Q value, in general, is a function of T, $\Delta P$ and $t$, and is represented by the following equation, viz.

$$Q = A \cdot t^{-1} \cdot \Delta P^{0.5} \cdot e^{-B/RT}$$

A, B=constant; $t$=wall thickness; $\Delta P = P_1 - P_2$=pressure differential of raw hydrogen and pure hydrogen, $R$= gas constant $\doteq$ 2 cal./gr. atom; $T$=° K.; therefore, Q (cm.$^3$/cm.$^2$ min.) increases in proportion to T, the square root of $\Delta P$, and is in inverse proportion to $t$. The permeable wall alloy of this invention can take T and $\Delta P$ greater as compared with the pure Pd and Pd-Ag alloy walls and is, at the same time, fully durable even if $t$ is made smaller, so that the economic effect is geometrical, resulting in a great advantage over conventional alloy walls.

Further, in this invention, as the elements of such specific compositions as are stated in the claim have been properly selected, the amount of hydrogen absorbed by the permeable wall alloy at a temperature below 200° C. decreases, and the atomic ratio, i.e., H/Me, becomes smaller to about 0.3–0.4, with the result that very little $\beta$ phase Pd is produced, and, also, there is the advantage that very little of the fragile compound resulting from the reaction between the Pd components and hydrogen at the normal temperature is formed. Therefore, the hydrogen permeable wall of Pd alloy of of H/Me≤0.4 must necessarily be used. For example, even when the permeable wall temperature drops due to power stoppage, though the permeable wall is placed in hydrogen, the alloy wall of this invention causes no trouble at all.

The following table shows the characteristics of various kinds of Pd alloys for hydrogen permeable walls, through comparison of the alloys belonging to this invention, pure Pd and Pd-Ag alloys (U.S. Patent No. 2,773,561), and other binary alloys.

TABLE

*Some Characteristic Properties of Various Pd-Alloys for Permeable Wall*

| | Pd-Alloy, Composition, wt. percent | | | | | | | | Atomic Ratio, H/Me at 20° C. | Change of Hardness, in Hv | | Tensile Strength in kg./cm.$^2$ at 500° C. | Permeation Rate, Q= cm.$^3$/cm.$^2$/ min., $P_1$=3 atm. $P_2$=0, $t$=0.15 mm., at 500° C. | Percent $\Delta(Q-Q_{pd})/Q_{pd}$, $Q_{pd}$=2.3 |
|---|---|---|---|---|---|---|---|---|---|---|---|---|---|---|
| | Pd | I-b Group | | VIII Group | | | | | | | | | | | |
| | | Ag | Au | Pt | Rh | Ru | Ir | Fe | | Before Use | After Use | | | |
| This invention | 65 | 30 | | 5 | | | | | 0.34 | 110 | 70 | 2,000 | 4.6 | 100 |
| | 65 | 28 | 5 | | | 2 | | | 0.33 | 90 | 83 | 1,500 | 4.8 | 109 |
| | 70 | | 25 | 5 | | | | | 0.34 | 100 | 62 | 1,550 | 4.6 | 100 |
| | 70 | | 25 | | 5 | | | | 0.35 | 120 | 90 | 1,900 | 4.5 | 96 |
| | 63 | 30 | | 2 | | | | | 0.34 | 110 | 95 | 2,200 | 4.6 | 100 |
| | 68 | 30 | | | 2 | | | | 0.32 | 150 | 120 | 2,350 | 5.0 | 117 |
| | 67 | 30 | | | | | 3 | | 0.40 | 140 | 125 | 1,770 | 4.5 | 96 |
| | 65 | Cu 10 | 20 | 5 | | | | | 0.40 | 120 | 95 | 1,280 | 4.5 | 96 |
| | 65 | 10 | 20 | 1 | 2 | 1.8 | | 0.2 | 0.32 | 135 | 120 | 1,950 | 5.5 | 140 |
| U.S. Patent No. 2,773,561 | 100 | | | | | | | | 0.75 | 50 | 110 | 700 | 2.3 | |
| | 90 | 10 | | | | | | | 0.70 | 55 | 95 | 910 | 3.4 | 48 |
| | 80 | 20 | | | | | | | 0.58 | 98 | 100 | 840 | 3.8 | 65 |
| | 70 | 30 | | | | | | | 0.41 | 57 | 55 | 770 | 4.1 | 78 |
| | 60 | 40 | | | | | | | 0.37 | 55 | 54 | 700 | 4.0 | 77 |
| 2 Components Alloy | 95 | | 5 | | | | | | 0.63 | 51 | 88 | 720 | 4.6 | 100 |
| | 90 | | 10 | | | | | | 0.60 | 50 | 60 | 760 | 5.0 | 117 |
| | 85 | | 15 | | | | | | 0.58 | 65 | 55 | 840 | 4.8 | 109 |
| | 80 | | 20 | | | | | | 0.46 | 66 | 53 | 910 | 4.6 | 100 |
| | 75 | | 25 | | | | | | 0.40 | 65 | 50 | 1,050 | 4.6 | 100 |
| | 90 | | | 10 | | | | | 0.46 | 52 | 110 | 820 | 2.8 | 22 |
| | 80 | | | 20 | | | | | 0.07 | 56 | 128 | 870 | 1.3 | −44 |
| | 95 | | | | 5 | | | | 0.71 | 52 | 114 | 850 | 3.1 | 35 |
| | 90 | | | | 10 | | | | 0.24 | 76 | 107 | 960 | 2.0 | −13 |

From the table, to explain the excellent points of this invention, because, when the atomic ratio is in the range of 0.32–0.40, very little β phase Pd is formed, there is no reason to fear that the alloys of this invention will become fragile, and, what is more, to observe the change in hardness after use as a hydrogen permeable wall, there are no alloys which have hardened after use. The tensile strength (kg./cm.$^2$) at 500° C. is strikingly greater than that of any other alloys, so that ΔP can be elevated. Percent Δ, i.e., the value of the increase in Q compared with that of pure Pd, shows the increase of 96–140%. The alloys of U.S. Patent No. 2,773,561 and other binary alloys, except for specific ones, generally have an atomic ratio, i.e., H/Me, of greater value and, after use as a permeable wall, they are much hardened and fragile. Some binary alloys have percent Δ to the same extent as this invention, but, because the atomic ratio, i.e., H/Me, thereof is great, and, further, because change in the hardness thereof is high, there are the defects that they tend to harden and that the tensile strength thereof is far smaller as compared with this invention.

Next, the working examples of this invention are given herein below.

*Example 1*

Pd 65%, Ag 28%, Au 5% and Ru 2% are melted together under vacuum into an alloy having an atomic ratio of 0.33, from which alloy is formed a one-end closed cylindrical tube of $t=0.15$ mm. and diameter 30φ x 800 mm. (length), and after inserting an insulated electric heating coil into the tube in contact with the inner wall thereof, the tube is heated. When raw hydrogen is introduced under pressure of 3 kg./cm.$^2$ ($P_1$, by gauge pressure) into said cylindrical tube, there is, outside the tube, collected pure hydrogen of 0 kg./cm.$^2$ ($P_2$, by gauge pressure) at the rate of 330 l./h. This pure hydrogen is confirmed, even by mass analysis and gas chromatography, not to contain any impurities other than heavy hydrogen $D_2$. Through measurement, the dew point thereof indicates −100° C., so it is the highly pure hydrogen having a moisture content of 0.00002 mg./l.—$H_2$.

*Example 2*

The permeable wall of a Pd 65%, Ag 30% and Pt 5% alloy, an atomic ratio=0.34, is far superior in the high temperature tensile strength to Example 1. When a permeable cylinder of the same dimension is used under the same conditions, pure hydrogen is obtained at the rate of 320 l./h. The purity, as well as the dew point temperature, of the hydrogen obtained are quite the same.

*Example 3*

The alloy of Pd 70%, Au 25% and Pt 5%, an atomic ratio=0.34, though the high temperature tensile strength is also great, is especially superior in the resistance to corrosive oxidation at high temperatures. When a permeable cylinder of the same dimension as the former two is used under the same conditions, pure hydrogen is obtained at the rate of 320 l./h., which is durable for continuous use for a long period, and is, especially, not attacked by amonia, $NH_3$, and moisture at around 500° C., the pure hydrogen obtained being confirmed not to contain any impurities and to have the dew point temperature of −100° C., the same as the former two examples.

We claim:
1. In a hydrogen purification process, the step of passing hydrogen through a wall of a palladium alloy of 2 to 40 percent of at least one metal of Group I$b$ of the Periodic Table, of 0.1 to 20 percent of at least one metal of Group VIII of the Periodic Table other than palladium, the remainder of said alloy substantially consisting of palladium.

2. In a process as set forth in claim 1, the atomic ratio of hydrogen to metal in said palladium alloy being less than 0.4 when said wall is in equilibrium with ambient hydrogen at 20° C.

3. A process for separating hydrogen from a gaseous mixture containing hydrogen which comprises feeding said mixture at a predetermined pressure to one side of a wall of an alloy essentially consisting of palladium, of 2 to 40 percent of at least one metal of Group I$b$ of the Periodic Table, and of 0.1 to 20 percent of at least one metal of Group VIII of the Periodic Table other than palladium, and withdrawing hydrogen from the other side of said wall at a pressure lower than said predetermined pressure.

4. A process as set forth in claim 3, wherein said mixture is fed to said one side at a temperature of approximately 500° C.

5. A process as set forth in claim 3, wherein said mixture is fed to said one side at a temperature of 500° C. to 600° C.

6. An apparatus for purification of hydrogen which comprises:
 (a) a wall having two opposite sides and selectively permeable to hydrogen, said wall being of a palladium alloy essentially consisting of 2 to 40 percent of at least one metal of Group I$b$ of the Periodic Table, of 0.1 to 20 percent of at least one metal of Group VIII of the Periodic Table other than palladium, and of palladium; and
 (b) means for holding one of said sides in contact with a gaseous medium including hydrogen at a pressure greater than the gas pressure at the other one of said sides.

7. An apparatus as set forth in claim 6, wherein the atomic ratio of hydrogen to metal in said alloy is less than 0.4 when said wall is in equilibrium with ambient hydrogen at 20° C.

8. An apparatus as set forth in claim 6, wherein said alloy includes 20 to 30 percent silver, 3 to 10 percent gold, 0.1 to 5 percent ruthenium, the remainder essentially being palladium.

9. An apparatus as set forth in claim 6, wherein said alloy includes 20 to 35 percent silver, 3 to 10 percent platinum, the remainder essentially being palladium.

10. An apparatus as set forth in claim 6, wherein said alloy includes 5 to 25 percent gold, 3 to 10 percent platinum, the remainder essentially being palladium.

References Cited by the Examiner

UNITED STATES PATENTS

| | | | |
|---|---|---|---|
| 1,174,631 | 3/16 | Snelling | 55—158 |
| 2,129,721 | 9/38 | Wise | 75—172 |
| 2,300,286 | 10/42 | Gwyn | 75—172 X |
| 2,773,561 | 12/56 | Hunter | 55—16 |
| 2,824,359 | 2/58 | Rhodes et al. | 75—172 X |
| 2,958,391 | 11/60 | De Rosset | 55—158 X |

NORMAN YUDKOFF, *Primary Examiner.*

REUBEN FRIEDMAN, EUGENE BLANCHARD, *Examiners.*